(12) United States Patent
Wajs

(10) Patent No.: US 8,624,923 B2
(45) Date of Patent: Jan. 7, 2014

(54) METHOD OF FORMING AN IMAGE BASED ON A PLURALITY OF IMAGE FRAMES, IMAGE PROCESSING SYSTEM AND DIGITAL CAMERA

(75) Inventor: Andrew Augustine Wajs, Haarlem (NL)

(73) Assignee: Silvercrest Investment Holdings Limited, Tortola (VG)

( * ) Notice: Subject to any disclaimer, the term of this patent is extended or adjusted under 35 U.S.C. 154(b) by 0 days.

(21) Appl. No.: 13/547,184

(22) Filed: Jul. 12, 2012

(65) Prior Publication Data

US 2012/0274814 A1 Nov. 1, 2012

Related U.S. Application Data

(63) Continuation of application No. 12/089,997, filed as application No. PCT/EP2005/055186 on Oct. 12, 2005, now abandoned.

(51) Int. Cl.
*G09G 5/00* (2006.01)

(52) U.S. Cl.
USPC ........................... 345/629; 382/271; 382/275

(58) Field of Classification Search
USPC ............ 345/629; 348/744, 745; 382/271, 275
See application file for complete search history.

(56) References Cited

U.S. PATENT DOCUMENTS

| | | | | |
|---|---|---|---|---|
| 5,033,103 A | * | 7/1991 | Sillart | 382/275 |
| 5,345,262 A | * | 9/1994 | Yee et al. | 348/745 |
| 6,009,206 A | * | 12/1999 | Acharya | 382/271 |
| 2008/0024683 A1 | * | 1/2008 | Damera-Venkata et al. | 348/744 |
| 2008/0165258 A1 | * | 7/2008 | Wajs | 348/222.1 |
| 2009/0220172 A1 | * | 9/2009 | Wajs | 382/284 |
| 2011/0228139 A1 | * | 9/2011 | Wajs | 348/239 |

FOREIGN PATENT DOCUMENTS

EP 1 154 633 A1 11/2001

OTHER PUBLICATIONS

O. Ratib, "PFT/CT Image Navigation and Communication", Journal of Nuclear Medicine Soc, Nucl. Med. USA, vol. 45, No. 1, Jan. 2004, pp. 46S-55S, XP008065310.

J. Boyce, "Noise Reduction of Image Sequences Using Adaptive Motion Compensated Frame Averaging", Institute of Electrical and Electronics Engineers, vol. 5, Conf. 17, Mar. 23, 1992, pp. 461-464, XP008065310.

M.E. Winter et al., "Resolution Enhancement of Hyperspectral Data", Aerospace Conference Proceedings, 2002, IEEE vol. 3, Mar. 9-16, 2002, pp. 1523-1529, XP010604287.

(Continued)

*Primary Examiner* — Chante Harrison

(74) *Attorney, Agent, or Firm* — Nixon Peabody LLP; Jeffrey L. Costellia

(57) ABSTRACT

Image fusion based on a modified method of frame averaging for noise removal by partly averaging over images having a smaller resolution than the desired resolution of the de-noised image. The set of images which are summed for averaging out noise consists of two subsets. The first set of images has a resolution (in terms of number of pixels) being smaller than the resolution of the images in the second set. The resolution of the images in the second set is the resolution of the 'high-definition' de-noised output image. The lower resolution images are up-sampled by scaling their pixel numbers to that desired output image. The gradation of the first set images is also adapted to avoid intensity saturation (flare) due to sommation. Image fusing is also done in fourier space using the high frequency components from the higher resolution images and the lower ones from the lower resolution images.

8 Claims, 5 Drawing Sheets

(56) References Cited

OTHER PUBLICATIONS

Li Ling et al., "Fusion of Images with Different Spatial Resolution", Geosicence and Remote Sensing Symposium Preceedings, 1998, vol. 3, Jul. 6, 1998, pp. 1310-1313, XP010292937.

B. K. Gunturk et al., "Multi-Frame Information Fusion for Gray-Scale and Spatial Enhancement of Images", Proceedings 2003 International Conference on Image Processing, vol. 3, 2003, pp. ll 319-ll 322, XP002385719.

* cited by examiner

METHOD OF FORMING AN IMAGE BASED ON A PLURALITY OF IMAGE FRAMES, IMAGE PROCESSING SYSTEM AND DIGITAL CAMERA

The invention relates to a method of forming a combined image based on a plurality of image frames.

TECHNICAL FIELD

The invention also relates to a system for processing arrays of intensity values, each array being suitable for representing an image frame at a resolution corresponding to the number of intensity values in the array.

The invention also relates to an imaging apparatus, e.g. a digital camera.

SUMMARY OF THE INVENTION

International patent application PCT/EP2005/052121 was filed before and published under number WO/2006/119802A1 after the date of filing of the present application, and is thus comprised in the state of the art according to Art. 54(3) EPC only. It describes a method of forming a combined final image from a plurality of image frames, including the steps of obtaining a first and at least one further array of pixel values, each array of intensity values encoding light intensity levels a each of a respective number of pixel positions in the respective image frame, the number determining the spatial resolution of the image frame concerned. A set of derived arrays of intensity values is generated, each derived array being based on a respective one of the obtained arrays of intensity levels and encoding light intensity levels at each of a common number of pixel positions in at least a region of overlap of the respective image frames. An array of combined intensity values is generated. Each element in that array is based on a sum of intensity values represented by a corresponding element in each of the respective derived arrays of intensity values. An array of intensity values encoding the combined final image is provided, the array being based on the array of combined intensity values. A first array of intensity values encoding at least the region of overlap at a higher resolution than the further arrays of intensity values is obtained. An array of intensity values encoding at least the region of overlap in the combined final image at a higher spatial resolution than the further arrays of intensity values is provided. The array of intensity values encoding the combined final image is based on a sufficient number of intensity values in the first array of intensity values to encode the region of overlap at a higher resolution than the further arrays of intensity values.

Forming a combined image by adding a plurality of image frames at least partially depicting the same region has the effect that the region of overlap has a higher Signal-to-Noise Ratio (SNR) in the combined image than in the individual image frames. However, in an image processing system, intensity values assume one of a range of discrete values, the number of which is determined by the number of bits by which the values are represented. This in turn is determined by the dynamic range allowed by the format in which the combined image is displayed, e.g. the JPEG standard or the resolution of a computer display. If the sum of the intensity values corresponding to a pixel in the respective image frames exceeds the maximum allowed by the range of discrete values, the sum value is clipped to stay within the range. If this happens for many intensity values in the array of intensity values representing the combined image, the combined image appears over-exposed.

It is an object of the invention to provide a method, system, imaging apparatus and computer program of the types indicated above, for providing in an efficient manner a combined image that has a relatively good SNR and little or no over-exposure.

This object is achieved according to the invention by providing a method of forming a combined image based on a plurality of image frames, including:

obtaining a first set of at least one array of intensity values for representing an image frame at a resolution corresponding to the number of intensity values in the array, and obtaining a second set of at least one array of intensity values for representing an image frame at a resolution corresponding to the number of intensity values in the array, wherein the combined image is represented by a final array of intensity values, wherein at least some of the intensity values in the final array are each obtained by executing a step of summing an intensity value from each of at least one array of intensity values based on at least one array of intensity values in only the first set and an intensity value from each of at least one array of intensity values based on at least one array of intensity values in only the second set, wherein, prior to executing the summing step, only the intensity values of the arrays in the first set are mapped from a scale within a first range to a scale within a second range.

Because at least some of the intensity values in the final array are each obtained by executing a step of summing an intensity value from each of at least one array of intensity values based on at least two arrays of intensity values, the SNR is improved. Because the intensity values of the arrays in the first set are mapped from a scale within a first range to a scale within a second range prior to executing the summing step, it is possible to use the full dynamic range allowed by the representation of the intensity values without going beyond the end of the scale on which they are represented. For this purpose, the second range is different from the first range. Because only the intensity values of the arrays in the first set are mapped, the method is relatively efficient.

An embodiment of the invention includes obtaining a first set and a second set arranged such that the image frames represented by the arrays in the first set are represented at lower resolutions than the image frames represented by the arrays in the second set This has the effect of increased efficiency, as relatively few intensity values are mapped from the scale within the first range to the scale within the second range.

In an embodiment, the at least one array of intensity values based on at least one array of intensity values in only the first set contains coefficients in the spatial frequency domain, the at least one array of intensity values based on at least one array of intensity values in only the second set contains coefficients in the spatial frequency domain and the intensity values in the final array are formed by coefficients in the spatial frequency domain, wherein at least one lower-order coefficient in the final array is obtained by summing an intensity value from each of the at least one array of intensity values based on at least one array of intensity values in only the first set and an intensity value from each of at least one array of intensity values based on at least one array of intensity values in only the second set, wherein at least one higher-order coefficient in the final array is obtained on the basis of only arrays of intensity values based on the second set.

This is a relatively efficient way of obtaining a combined image represented at a relatively high resolution on the basis of a first set of arrays representing image frames at a lower resolution and a second set of arrays representing image frames at a higher resolution. Interpolation or similar techniques to increase the resolution of the image frames represented by the arrays of the first set is not required. Instead, the information in the higher resolution image frames represented by the second set is used to generate a relatively high-resolution combined image, whereas summation of the lower-order coefficients serves to decrease the perceptible noise in the image.

In an embodiment, at least some of the arrays of intensity values in the first and second set are obtained by reading out measurement values from an image-capturing device comprising an array of light-sensitive cells, wherein each intensity value in the final array is based on at least one intensity value in an array comprised in the second set.

Because the arrays in the first set represent image frames at a lower resolution they contain fewer intensity values. Thus, the time to read out the measurement values is reduced. This allows the image frames represented by the first and second sets of arrays to be read out in quick succession, decreasing the effect of camera shake or movement in the scene that is captured. Because each intensity value in the final array is based on at least one intensity value in an array comprised in the second set, the effect of decreased blur due to movement is not obtained at the expense of the resolution of the combined image.

An embodiment includes determining an upper limit of the second range at least partly in dependence on the number of arrays of intensity values in the second set.

Thus, the risk of an over-exposed combined image is reduced.

In an embodiment, at least one of the arrays of intensity values in the first set is obtained by obtaining a plurality of arrays of intensity values for representing an image frame at a resolution corresponding to the number of intensity values in the array, and by summing an intensity value from each of the plurality of arrays to obtain a corresponding intensity value in the at least one array in the first set.

Thus, an array representing an image that is the sum of a plurality of image frames is scaled. This has the effect of decreasing the amount of scaling that has to be done, making the method more efficient. In addition, random noise over the plurality of arrays that are summed to form an array in the first set is filtered out by means of the addition.

In an embodiment, at least one of the arrays of intensity values in the first set is obtained by obtaining a plurality of arrays of intensity values for representing an image frame at a resolution corresponding to the number of intensity values in the array, wherein the method further includes
summing an intensity value from each of the obtained plurality of arrays to obtain a corresponding intensity value in an intermediate combined array, and
determining an upper limit of the second range at least partly in dependence on at least one intensity value in the intermediate combined array.

Thus, the appropriate extent of the second range can be determined relatively accurately, since it is based on an array of intensity values that is quite representative of the final array. This embodiment is also relatively efficient, since it does not require an analysis of each of a plurality of arrays in the first set.

In an embodiment, at least the arrays of intensity values in the first set are obtained by obtaining a plurality of arrays of intensity values for representing colour image frames in a first colour space, and applying a transformation to a plurality of arrays of values in a second colour space, wherein, in the first colour space, an image frame is represented by parameter value combinations, each parameter indicating the intensity of one of a plurality of colour components, whereas, in the second colour space, an image frame is represented by parameter value combinations, one parameter of the combination indicating a hue and at least one of the other parameters being indicative of light intensity.

This embodiment has the advantage that the mapping from the first scale to the second scale need be carried out on fewer arrays of intensity values. Instead of separate arrays of intensity values for each colour component, or arrays of intensity value combinations, only the array or arrays of parameter values indicative of light intensity in the second colour space, or arrays derived based thereon, need be processed. The colour information is contained in an array of parameter values indicating hues, which need not be scaled to prevent saturation of the combined image.

According to another aspect, there is provided in accordance with the invention a system for processing arrays of intensity values, each array being suitable for representing an image frame at a resolution corresponding to the number of intensity values in the array,
wherein the system is configured to retrieve a first set of at least one array of intensity values and a second set of at least one array of intensity values, the arrays in the first set and arrays in the second set representing respective image frames, and to form a final array of intensity values representing a combined image,
wherein the system is configured to obtain each of at least some of the intensity values in the final array by executing a step of summing an intensity value from each of at least one array of intensity values based on at least one array of intensity values in only the first set and an intensity value from each of at least one array of intensity values based on at least one array of intensity values in only the second set, and
wherein the system is configured to map, prior to executing the summing step, only the intensity values of the arrays in the first set from a scale within a first range to a scale within a second range.

According to another aspect, there is provided in accordance with the invention an imaging apparatus, e.g. a digital camera, comprising a processor and at least one storage device for storing a plurality of arrays of intensity values, wherein the imaging apparatus is configured to execute a method according to the invention.

The imaging apparatus makes relatively efficient use of digital signal processing capacity. In particular, because not all arrays of pixel values are scaled, the amount of values to be retrieved from a look-up table implementing the mapping function is relatively low.

According to another aspect of the invention, there is provided a computer program, including a set of instructions capable, when incorporated in a machine-readable medium, of causing a system having information processing capabilities to perform a method according the invention.

The computer program can be run on a general-purpose computer for post-processing of captured images, or it can be provided in the form of firmware for an image-capturing device such as a digital camera.

BRIEF DESCRIPTION OF THE DRAWINGS

The invention will be explained in further detail with reference to the accompanying drawings, in which.

DETAILED DESCRIPTION

Figure 1:
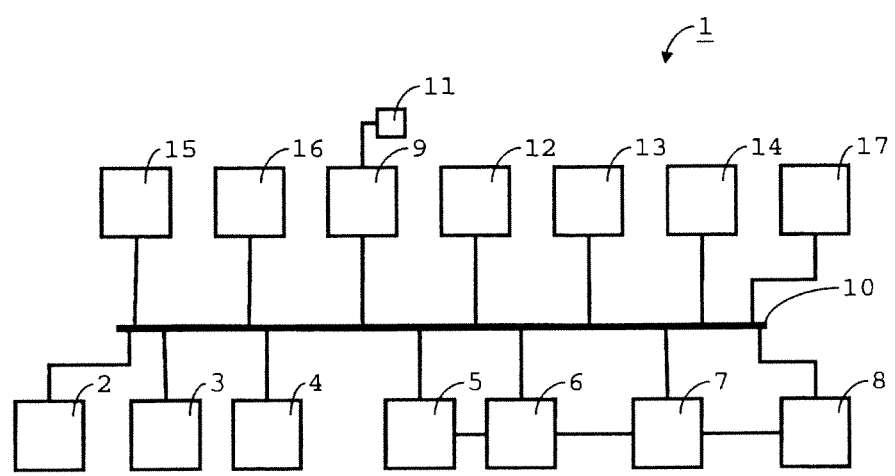
FIG. 1 illustrates schematically a digital camera equipped to implement a method of forming a combined image.

FIG. 1 illustrates some components of a digital camera 1 as an example of an imaging apparatus adapted for implementing the methods described below. Other examples of suitable imaging apparatus include scanners and photocopying apparatus. Because the methods of forming a combined image require relatively little processing capacity, it is advantageous to apply them in the digital camera 1.

The digital camera 1 includes a lens system 2 for focussing on one or more objects in a scene that is to be represented by a combined image. When a shutter 3 is opened, the scene is projected through an aperture in a diaphragm 4 onto a photosensitive area of an image-capturing device 5. Instead of the shutter 3, an electronic shutter implemented by suitable control of the image-capturing device 5 could be used. The shutter time is controllable, as is the diameter of the aperture. The image-capturing device 5 can be a device implemented in Complementary Metal-Oxide Semiconductor (CMOS) technology, or a Charge-Coupled Device (CCD) sensor, for example. The photosensitive area of the image-capturing device 5 is divided into areas occupied by pixel cells. Each pixel cell includes a device for generating a signal indicative of the intensity of light to which the area that the pixel cell occupies is exposed. An integral of the signal generated by a device is formed during exposure, for example by accumulation of photocurrent in a capacitor. Subsequent to exposure for the duration of an exposure time interval, the values of the integrals of the generated signals are read out row by row.

The (analogue) values that are read out are provided to an Analogue-to-Digital (A/D-)converter 6. The A/D converter samples and quantises the signals received from the image-capturing device 5. This involves recording the intensity values on a scale with discrete levels, the number of which is determined by the number of bits of resolution of the digital words provided as output by the A/D converter 6. Thus, the A/D-converter 6 provides as output an array of intensity values recorded on a scale occupying a first range. Each intensity value is associated with a particular pixel position in an image frame, corresponding to a photosensitive cell or a plurality of adjacent photosensitive cells. In the latter case, the values read out from the image-capturing device 5 are preferably obtained by "binning" the values corresponding to a plurality of adjacent photosensitive cells. The areas to which the "binned" values correspond may overlap.

Each exposure of the image-capturing device 5 thus results in an array of intensity values representing an image frame. As will be explained in more detail below, the intensity values of one or more arrays may be mapped to a different scale occupying a second range by a Digital Signal Processor (DSP) 7. In certain embodiments, the DSP 7 is also suitable for performing such operations as interpolation between pixel values and optionally compression of the image. It may also carry out a transformation of the intensity values to the spatial frequency domain, such as a Direct Cosine Transform (DCT).

Arrays of intensity values are stored in a storage device 8. The storage device can be any usual type of storage device, e.g. built-in flash memory, replaceable flash memory modules, an optical disk drive or a magnetic disk drive.

Capturing and processing of images is carried out under control of a microprocessor 9, which issues commands over a bus 10. The microprocessor 9 is assisted by a co-processor 11 in the illustrated embodiment. The co-processor 11 is preferably a digital signal processor for performing image compression, for example in accordance with the JPEG standard. The microprocessor 9 comprises a volatile memory and has access to instructions stored in Read-Only Memory (ROM) module 12. The instructions provide the digital camera 1 with the capability to perform a method of forming a combined image by adding a plurality of captured image frames, which method is carried out under the control of the microprocessor 9.

Other components connected to the bus 10 include an input interface module 13 for receiving user commands, and an output interface module 14 for returning status information. In the illustrated embodiment, a motion sensor 15 is present for sensing and measuring movement of the digital camera 1. In other embodiments, a series of image frames captured in rapid succession is analysed to determine the amount and/or direction of movement of the digital camera 1. In addition, the digital camera 1 comprises an exposure metering device 16 and a flash driver 17 for directing the operation of a flash (not shown).

In use, a user issues a command to form a single image of a scene, which is passed on to the microprocessor 9 through the input interface module 13 and the bus 10. In response, the microprocessor 9 controls the digital camera 1 such that a plurality of underexposed image frames or image frames with a high ISO setting are captured. A high ISO setting means that the sensitivity of the image-capturing device 5, calibrated along the linear film speed scale according to international standard ISO 5800:1987 is set to a high level. The captured images represent respective scenes that overlap at least partially. Each image frame, specifically each colour component of an image frame, is represented by an array of pixel values. Each pixel value corresponds to the light intensity of the associated colour component over an area associated with a pixel. Given that each area associated with a pixel corresponds to a part of the area of the image-capturing device 5, which is constant, the number of intensity values contained in an array corresponds to the spatial resolution of the image frame. This is also the case where the intensity values are coefficients in the spatial frequency domain, since the inclusion of more values in an array corresponds to the presence of coefficients of a higher order.

To obtain the sequence of individually underexposed image frames, the microprocessor 9 determines a desired exposure for a final image to be formed on the basis of the image frames. This exposure is divided over the image frames. The desired exposure can be determined from user input or automatically on the basis of one or more values obtained from the exposure metering device 16. Exposure levels for each of the image frames result in settings of the diaphragm 4, shutter speed and flash intensity. In addition, the microprocessor 9 determines amplification levels for the signals read out from the image-capturing device. These determine the range of values within which the intensity values in the arrays representing the image frames lie. The number of bits with which the intensity values are represented determines the dynamic range of the intensity values. In the example, it will be assumed that the intensity values are represented in eight bits, so that there are 255 possible non-zero values. Instead of underexposing the image frames, the linear-scale ISO setting (also known as ASA number) of the image-capturing device 5 can be increased by the same factor as the underexposure factor. This results in increased noise levels in the individual frames, which are reduced through the combination processes presented below.

In the embodiments described herein, a distinction is made between a first set of arrays of intensity values representing associated respective image frames and a second set of arrays of intensity values representing associated respective image frames. The distinction is made on the basis of how the arrays are processed subsequent to capturing of the image frames.

Figure 2:
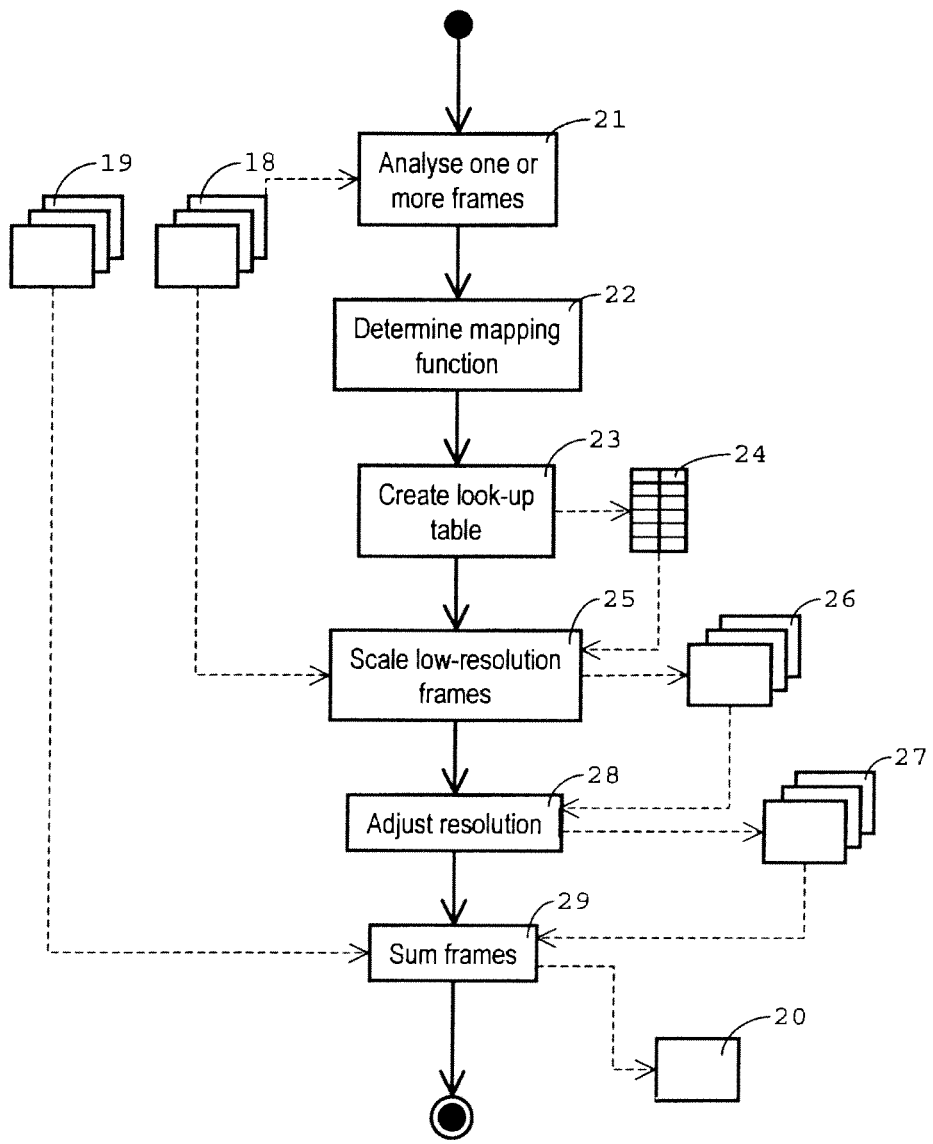
FIG. 2 illustrates schematically a first embodiment of a method of forming a combined image.

In a first embodiment, depicted in FIG. 2, a first set 18 of arrays of intensity values represents image frames at a relatively low spatial resolution, whereas a second set 19 of arrays of intensity values represents image frames at a relatively high resolution. Since the spatial resolution is proportional to the number of intensity values in the arrays, it follows that the arrays in the first set contain fewer values than those in the second set 19. This reduces the processing requirements, which is advantageous, as will become clear.

It is noted that the amount of processing is already reduced merely by the division of a sequence of arrays into the first set 18 and second set 19, so that the fact that the first set represents image frames at a lower resolution than the second set is an advantageous, but optional feature. Furthermore, it is not required, but efficient in terms of processing, that the arrays that share a set all have the same number of elements, i.e. that the image frames they represent each have the same resolution. In the illustrated embodiment, a final array 20 of intensity values representing a combined image is formed on the basis of the arrays in the first and second set 18,19 only. In other embodiments, there may be a third set of arrays representing image frames in the sequence of successively captured image frames on which the combined image is based.

An object of the method illustrated in FIG. 2 is to scale the intensity values in the arrays of the first set 18 such that the final array 20 contains intensity values that occupy the full dynamic range. The method serves to prevent a situation in which all the intensity values in the final array are clipped at the highest of the 255 values afforded by an eight-bit representation.

In a first step 21, one or more arrays of intensity values in the first set 18 of arrays are at least partially analysed. In one embodiment, the analysis comprises the forming of a histogram of some or all of the intensity values. To reduce the processing effort required to generate a histogram, only one value in every block of sixty-four values could be used.

If a significant number of intensity values lies above a threshold value, then a mapping function is required, which mapping function is determined in a second step 22. The second step 22 is followed by a step 23 in which a look-up table 24 is generated on the basis of the mapping function. For each of 255 intensity values, a scaled value is entered into the look-up table 24. Using a look-up table allows the mapping to be carried out by the DSP 7, which is relatively efficient. Thus, the use of a look-up table makes the methods presented herein quite suitable for implementation in an imaging apparatus, such as the digital camera 1.

Only the arrays of intensity values in the first set 18 are mapped (step 25) to arrays of scaled intensity values in a set 26. Each intensity value is used as an index into the look-up table 24 to determine its scaled value. It will be appreciated that, by scaling only the intensity values in the arrays forming the first set 18, a smaller look-up table is required. Moreover, the number of look-up operations is much reduced. As will be seen, the final array 20 can still represent a combined image at a higher resolution, because each intensity value in the final array is based on at least one intensity value in an array comprised in the second set 19. It is noted that the mapping function is applied directly to the arrays of intensity values in the first set 18 in other embodiments, so that the look-up table 24 is dispensed with.

The mapping function used to populate the look-up table 24 maps the intensity values from a first scale within a first range to a second scale occupying a second, smaller range. In one embodiment, the upper limit of the second scale is determined on the basis of at least two factors. A first factor is the extent to which the intensity values of the arrays analysed in the first step 21 exceed a certain threshold value. The second factor is based on the number of arrays of intensity values in the second set 19. More specifically, the threshold value is the maximum value of the dynamic range for encoding the values in the final array 20, divided by the number of arrays in the first and second sets 18,19. The mapping function is chosen to ensure that a substantial proportion of the intensity values in each of the arrays of the set 26 of arrays of scaled intensity values remain below the threshold. The second factor in this example is based on the ratio of the number of arrays in the second set 19 to the number of arrays in the first set 18. The upper value of the second scale is obtained by reducing the threshold by an amount corresponding to this ratio. Thus, the fact that, only the arrays in the first set 18 of the first and second sets 18,19 are scaled is taken into account.

In an embodiment that is more efficient in its implementation, a fixed curve or look-up table is used to determine the scaling in dependence only on the number of arrays of intensity values in the first and second sets 18,19. Alternatively, a mapping function could be selected in dependence on the degree of overexposure or, equivalently, the factor by which the sensitivity of the image-capturing device 5 used to capture the arrays of intensity values on which the arrays in the first and second sets 18,19 are respectively based has been increased.

In an advantageous embodiment, the first step 21 is preceded by a step (not shown), in which the first and second sets 18, 19 of arrays of intensity values are obtained by obtaining a plurality of arrays of intensity values for representing colour image frames in a first colour space, and applying a transformation to a plurality of arrays of values in a second colour space, wherein, in the first colour space, an image frame is represented by parameter value combinations, each parameter indicating the intensity of one of a plurality of colour components, whereas, in the second colour space, an image frame is represented by parameter value combinations, one parameter of the combination indicating a hue and at least one of the other parameters being indicative of light intensity. In the specific embodiment, arrays of intensity values representing image frames in the RGB (Red Green Blue) colour space are transformed to respective arrays of parameter values representing image frames in the HLS (Hue, Lightness, Saturation) colour space. The RGB colour space is an additive colour space, wherein the intensity of each of the three colour components is encoded separately. If the entire method depicted in FIG. 2 is carried out in the RGB colour space, then the method would in essence have to be carried out in triplicate. The first and second steps 21,22 would involve analysis of the three arrays that belong together in the sense that they represent a colour component of the same image frame. At least the scaling step 25 involves scaling three arrays of intensity values per image frame. In the HLS colour space, an image is represented by the parameter combination Hue, indicating the relative strengths of three colour components, Saturation, providing a scale from a grey level to a full colour, and Lightness (also called Luminance) corresponding substantially to the average intensity of the colour components. Only the arrays of Lightness values in the first set 18 are scaled. It is noted that the HSV (Hue, Saturation, Value) colour space is usable as an alternative to the HSL colour space, and that the CMYK and YUV colour spaces are alternatives to the RGB colour space.

As mentioned, each intensity value in the final array 20 is based on at least one intensity value in an array comprised in the second set 19 of arrays of intensity values.

In the embodiment illustrated in FIG. 2, this is assured by summing corresponding pixel values of each of the arrays in the set 26 of arrays of scaled intensity values In order to obtain a high-resolution combined image, a set 27 of resolution-adjusted arrays is generated (step 28). In this step 28, the spatial resolution of the arrays in the set 26 of arrays of scaled intensity values is adjusted by a multiplication factor, and is increased. An alternative would be to decrease the resolution of the image frames represented by the arrays in the second set 19. One way of increasing the spatial resolution of the image frames represented by the arrays in the set 26 of arrays of scaled intensity values is to interpolate between the intensity values in the arrays of scaled intensity values.

The final array 20 is obtained by summing (step 29) an intensity value from each of the arrays in the set 27 of resolution-adjusted arrays and value from each of the second set 19 of arrays. Intensity values corresponding to the same pixel in the scene represented by the image frames are added.

To take account of camera shake, an additional step (not shown) is carried out to correct the image frames. The correction may be carried out prior to the first step 21 shown in FIG. 2, so that the arrays of the first and second set 18,19 are the result of the correction operation. In this case, each array in the first and second sets 18,19 is based on an array of intensity values obtained by the image-capturing device 5 and corrected in accordance with a motion vector. The motion vector describes the motion of the camera 1 between the points in time at which the arrays of intensity values were obtained by the image-capturing device. It is based on data obtained from the motion sensor 15 or based on an analysis of the captured image frames using a method described more fully in international patent application PCT/EP04/051080, which is hereby incorporated by reference. In that application, a method is described that includes calculating a motion vector representing at least a component indicative of relative movement of at least a part of successive image frames in a sequence of image frames, wherein the step of calculating the motion vector includes a step of determining at least a first term in a series expansion representing at least one element of the motion vector, which step includes an estimation process wherein at least the part in each of a plurality of the image frames is repositioned in accordance with the calculated motion vector. The estimation process includes calculation of a measure of energy contained in an upper range of the spatial frequency spectrum of the combined image and the step of determining at least the first term includes at least one further iteration of the estimation process to maximise the energy.

In an alternative embodiment, the image frames are aligned using a method known per se by the name of Random Sample Consensus (RANSAC). This method is suitable where there is sufficient light to capture image frames.

Figure 3:
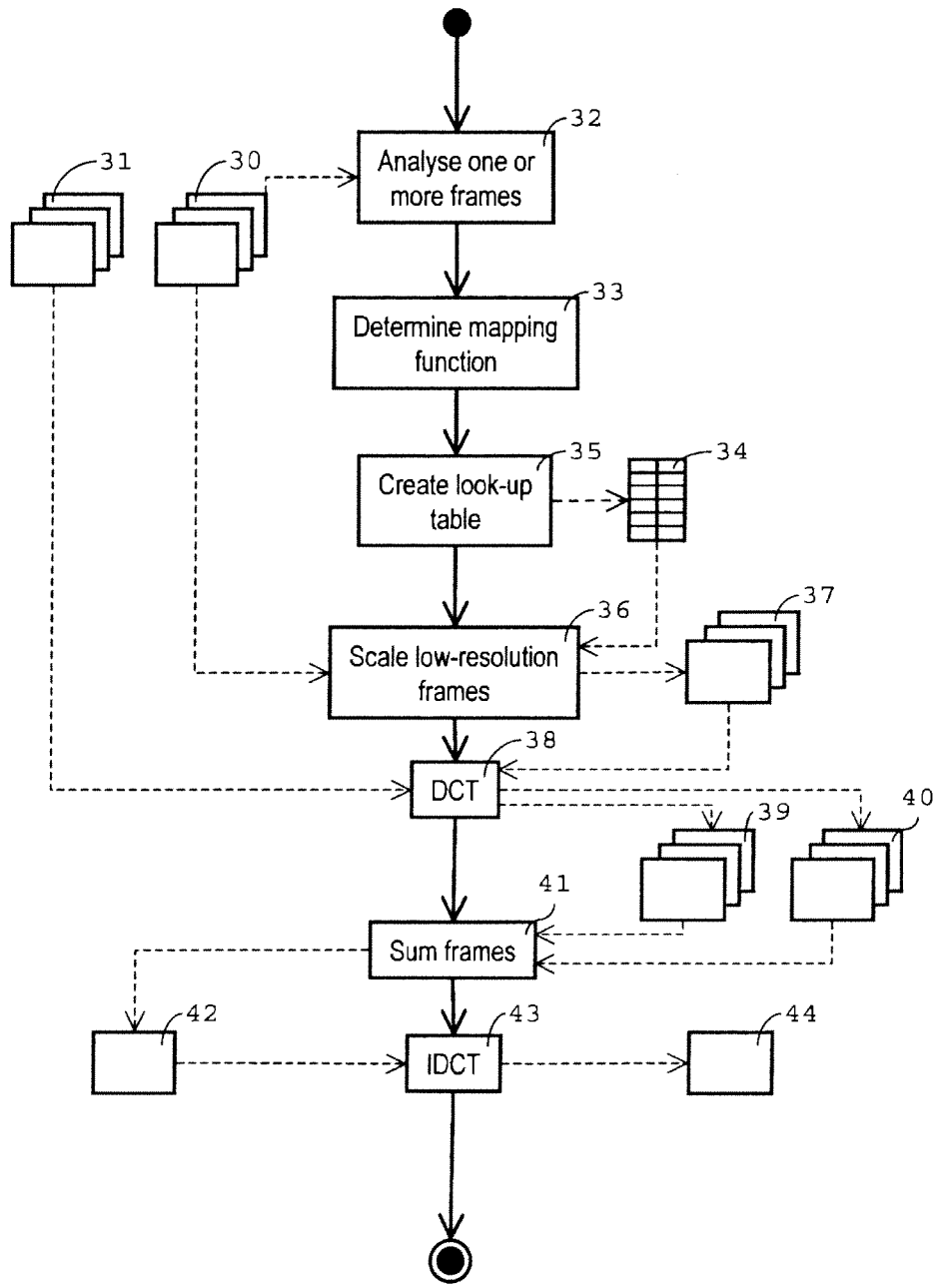
FIG. 3 illustrates schematically a second embodiment of a method of forming a combined image.

FIG. 3 illustrates a variant of the method shown in FIG. 2. This embodiment is also based on a first set 30 of arrays of intensity values and a second set 31 of arrays of intensity values. Each intensity value is a pixel value, corresponding to the light intensity of an associated colour component over an area associated with a pixel. What has been stated above regarding the first and second set 18,19 shown in FIG. 2 applies equally to the first and second set 30,31 shown in FIG. 3. Again, this description will assume that the arrays of intensity value in the first set 30 of arrays represent image frames at a lower resolution than the arrays in the second set 31.

A first step 32 in the method of FIG. 3 corresponds to the first step 21 shown in FIG. 3. In a subsequent step 33, a mapping function is again determined in order to map the intensity values of the arrays in the first set 30 from a scale occupying a first range to a second scale occupying a second range. The mapping function is determined on the basis of at least parts of some or all of the arrays in the first set 30. It is determined in substantially the same way as in the embodiment of FIG. 2. Similarly, a look-up table 34 is created in a step 34 following the step 33 of determining the mapping function. The look-up table 34 is used (step 36) to generate a set 37 of arrays of scaled intensity values, in which each array is based on a corresponding array in the first set 30 of arrays of intensity values.

The variant of FIG. 3 differs from the one shown in FIG. 2, in that a transformation to the spatial frequency domain is carried out in another step 38 subsequent to the scaling step 36. This transformation step 38 is implemented using a Discrete Cosine Transform (DCT) in the illustrated example. The set 37 of arrays of scaled intensity values is the basis for a first set 39 of arrays of DCT coefficients. The second set 31 of arrays of intensity values is the basis for a second set 40 of arrays of DCT coefficients. It is observed that the DCT transform is part of the JPEG (Joint Photographic Experts Group) compression algorithm, and that it is advantageous to implement such an algorithm in a special-purpose processor, such as the DSP 7 or co-processor 11. A transformation from the RGB colour space to the HLS colour space is also part of the JPEG algorithm, so that this feature is also applied to advantage in the embodiment illustrated in FIG. 3. The transformation between colour spaces has been detailed above.

A summation step 41 is carried out in the spatial frequency domain to obtain a final array 42 of DCT coefficients. The final array 42 forms an array of intensity values representing a combined image, since each coefficient is indicative of the intensity level of a spatial frequency component, and the set of spatial frequency components contains all the information necessary to render the combined image. The low-frequency coefficients of the final array 42 are obtained by summing the low-frequency coefficients of each array in the first set 39 of arrays of DCT coefficients and the low-frequency coefficients of each array in the second set 40 of arrays of DCT coefficients. The high-frequency coefficients are obtained by summing the high-frequency coefficients of each array in the second set 40 of arrays of DCT coefficients. Since these higher-order coefficients are absent in the (smaller) arrays of the first set 39 of arrays of DCT coefficients, only some of the intensity values in the final array 42 of DCT coefficients are obtained on the basis of both the first and second set 30,31 of arrays of intensity values. The summation step 41 is preferably implemented so as to take account of the differing number of addends used to obtain each coefficient in the final array 42.

An Inverse Discrete Cosine Transformation (IDCT) 43 results in an array 44 of intensity values in the spatial domain. Both the transformation step 38 and the IDCT 43 are advantageously carried out by the co-processor 11 in the digital camera 1.

Figure 4:
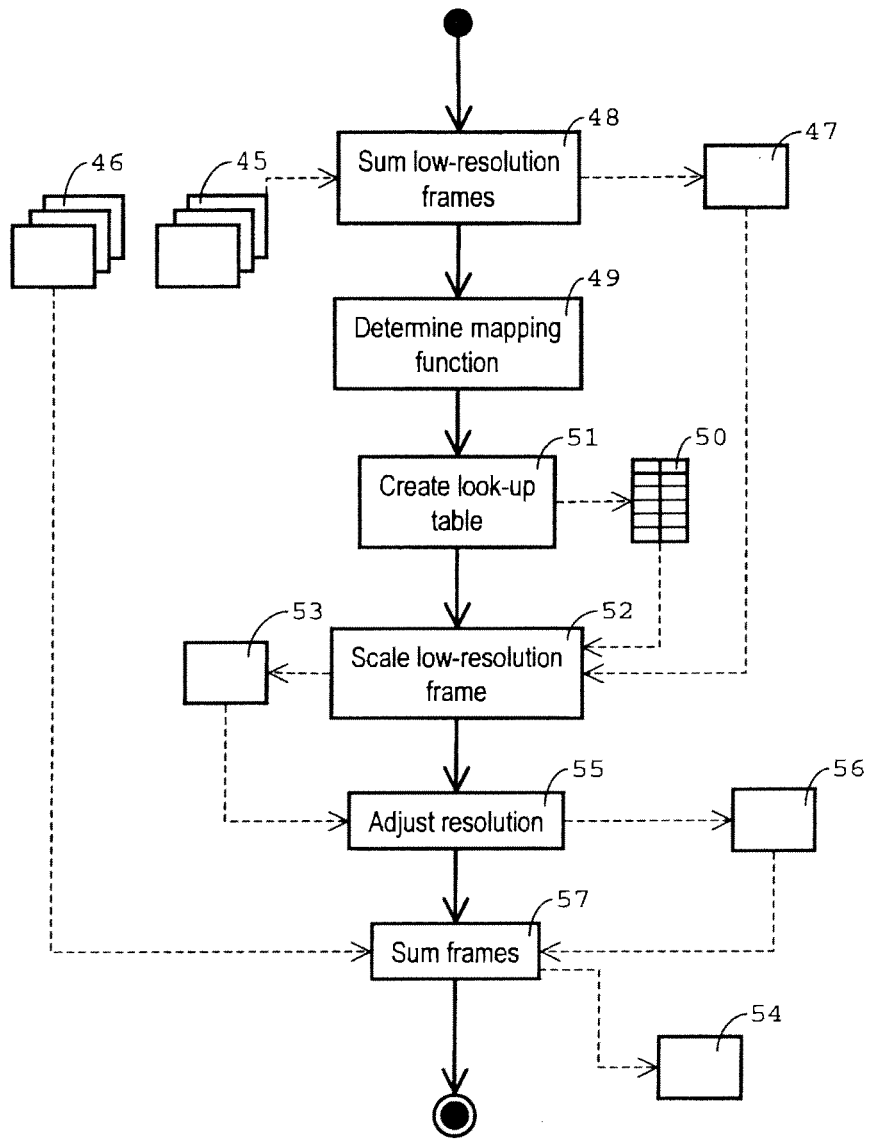
FIG. 4 illustrates schematically a third embodiment of a method of forming a combined image.

FIG. 4 illustrates an embodiment for simplifying the determination of the mapping function from the first scale to the second scale, as well as simplifying the scaling step. It operates on the basis of a first set 45 of arrays of pixel values and a second set 46 of arrays of pixel values.

A first sum array 47 is formed in a first step 48. On the assumption that the arrays in the first set 45 represent respective image frames at the same resolution, each intensity value in the first sum array is obtained by summing the corresponding intensity values from each of the arrays in the first set 45. If the resolutions are not the same, interpolation may be carried out first, or the arrays representing higher-resolution image frames may be reduced to correspond to a common resolution. The first sum array 47 is also suitable for representing an image frame, albeit one based on a plurality of preceding image frames, and forms a set of arrays consisting of one member. In alternative embodiments, a plurality of sum arrays could be formed, each based on a subset of arrays in the first set 45, with the plurality of sum arrays forming a first set in the terminology used herein.

The first sum array 47 of intensity values is analysed (step 49) to determine a mapping function for mapping a first scale occupying a first range to a second scale occupying a second range. As described before, the analysis advantageously comprises the forming of a histogram of some or all of the intensity values, i.e. DCT coefficients. Again, this may be carried out using one value per block of intensity values within the first sum array. However, the embodiment of FIG. 4, because only the first sum array 47 is analysed, allows for a more involved analysis as compared to embodiments in which a number of arrays of intensity values have to be analysed.

If a significant number of intensity values lies above a threshold value, then a mapping function is required. A look-up table 50 is generated (step 51) on the basis of the mapping function. For each of, for example, 255 intensity values, a scaled value is entered into the look-up table 50.

Only the first sum array 47 of intensity values is mapped (step 52) to a scaled first sum array 53. Preferably, the arrays in the first set 45 of intensity values represent image frames at a lower resolution than the arrays in the second set 46 of arrays. Even if this is not the case, it is still feasible to generate a first sum array 47 representing a combined image frame at a lower resolution than that at which image frames are represented by the arrays in the second set 46 of arrays of intensity values. Thus, the number of look-up operations is kept relatively small.

As before, the mapping function used to populate the look-up table 50 maps the intensity values from a first scale within a first range to a second scale occupying a second, smaller range. The upper limit of the second scale is again determined on the basis of at least two factors. A first factor is the extent to which the intensity values of the first sum array 47 exceed a certain threshold value. The second factor is based on the number of arrays of intensity values in the second set 46. More specifically, the threshold value is the maximum value of the dynamic range for encoding the values in the first sum array 47. The mapping function is chosen to ensure that a substantial proportion of the intensity values in the scaled first sum array 53 remain below the threshold. The second factor in this example is based on the ratio of the number of arrays in the second set 46 to the number of arrays in the first set 45. The upper value of the second scale is obtained by reducing the threshold by an amount corresponding to this ratio. Thus, the fact that, only the first sum array 47 is scaled, and not also the arrays in the second set 46 of arrays of intensity values, is taken into account.

Scaling only the first sum array 47 reduces even further the number of look-up operations. Nevertheless, it would be possible to analyse the first sum array 47 to derive a mapping function for scaling the individual arrays in the first set 45 of arrays, which are then added after having been scaled. Alternatively, it would be possible to analyse the individual frames in the first set 45 of arrays of intensity values, in order to derive a mapping function for scaling the first sum array 47. The effect of scaling the first sum array 47 is to reduce the amount of noise that propagates to a final array 54 of intensity values representing a combined image.

The final array 54 of intensity values represents a combined image at a higher resolution than the scaled first sum array 53. For this reason, the latter is processed (step 55) to obtain a resolution-adjusted scaled first sum array 56. Again, interpolation is a method by which the intensity values in the resolution-adjusted scaled first sum array 56 can be obtained.

The final array 54 is obtained in a final step 57. In this step 57, each intensity value in the final array 54 of intensity values is obtained by summing an intensity value from the resolution-adjusted scaled first sum array 56 and the corresponding respective intensity values from each of the arrays in the second set 46 of arrays of intensity values. It will be apparent that the final array 54 is thus formed of intensity values that are each based on at least one intensity value in an array in the second set 46 of arrays of intensity values, to achieve a high-resolution representation of the combined image.

Figure 5:
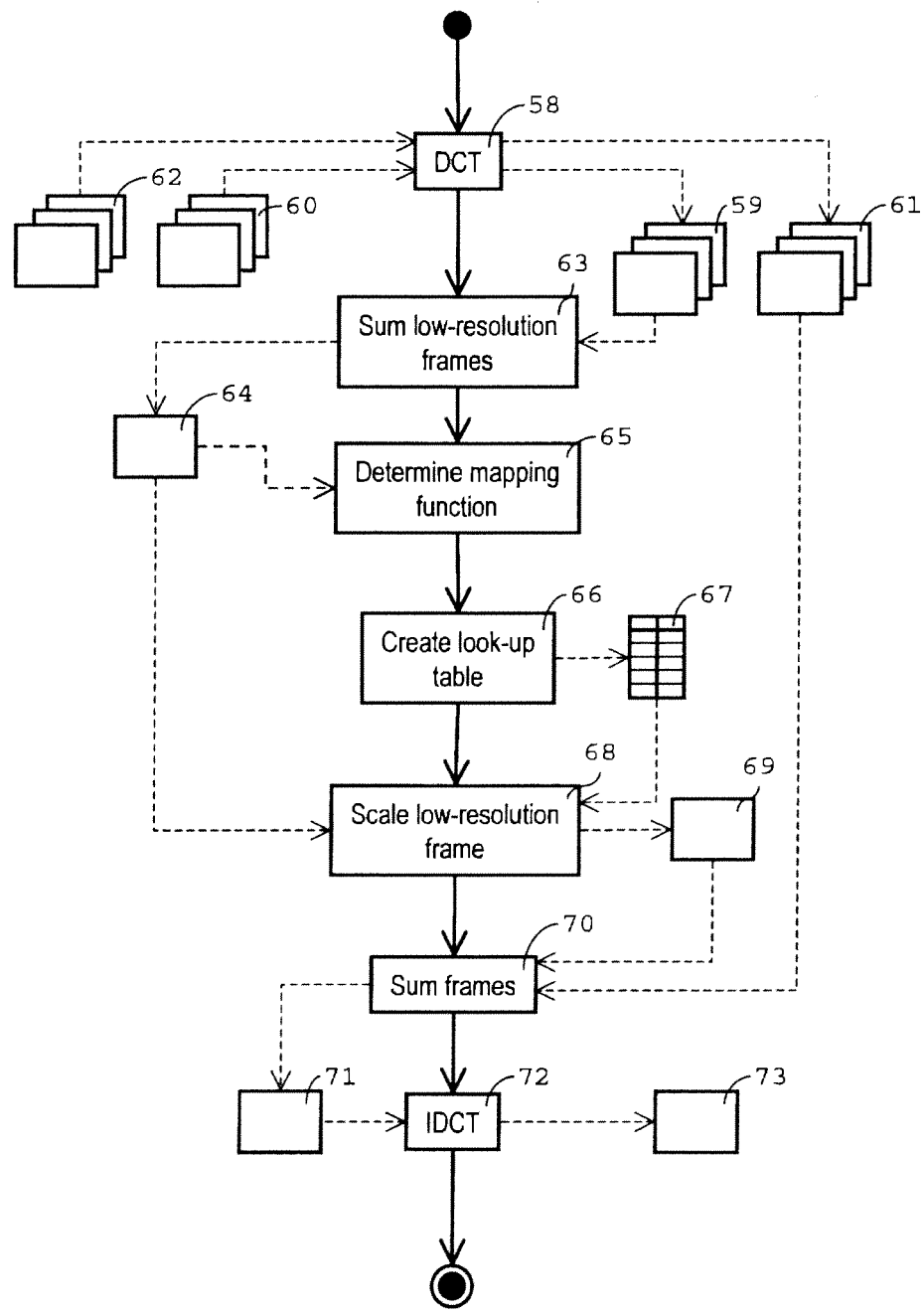
FIG. 5 illustrates schematically a fourth embodiment of a method of forming a combined image.

FIG. 5 shows a variant in which calculation is largely carried out in the spatial frequency domain, and which does not necessarily require interpolation or another process for increasing the resolution at which an image frame is represented. The variant illustrated in FIG. 5 commences with a DCT operation 58. The DCT operation 58 is used to obtain a first set 59 of arrays of DCT coefficients for representing a set of corresponding image frames at a first resolution. This first set 59 is based on a set 60 of arrays of pixel values encoding the image frames in the spatial domain as opposed to the spatial frequency domain. A second set 61 of arrays of DCT coefficients is based on a second set 62 of arrays of pixel values encoding image frames in the spatial domain at a second resolution. In this example, it will again be assumed that the second resolution is higher than the first resolution.

In a subsequent step 63, the arrays in the first set 59 of arrays of DCT coefficients are processed to obtain a first sum array 64. Each DCT coefficient in the first sum array 64 is obtained by summing the corresponding DCT coefficients in the respective arrays of the first set 59.

The first sum array 64 is analysed to determine (step 65) a mapping function mapping the DOT coefficients in the first sum array 64 from a first scale occupying a first range to a second scale occupying a second, preferably smaller, range. This step 65 is carried out using any of the methods outlined above with regard to the corresponding steps 22, 33, 49 in the methods of FIGS. 2-4. Subsequently (step 66) a look-up table 67 is created on the basis of the mapping function.

The mapping functions is based at least partly on the number of arrays in the second set 61 of arrays of DCT coefficients. This is done because only the DCT coefficients in the first sum array 64 are mapped from the first scale to the second scale (step 68), whereas those in the arrays forming the second set 61 of arrays of DCT coefficients are not. The result of the scaling carried out in this step 68 is a scaled first sum array 69.

The scaled first sum array 69 and the arrays in the second set 61 of arrays of DCT coefficients are summed in a step 70 similar to the summation step 41 in the embodiment illustrated in FIG. 3. A final array 71 of DCT coefficients is obtained. The lower-order DCT coefficients in the final array 71 of DCT coefficients are each obtained by summing the lower-order coefficients of the scaled first sum array 69, which is based on the first sum array 64, and the corresponding lower-order coefficients of the arrays of the second set 61 of arrays of DCT coefficients. The higher-order DCT coefficients in the final array 71 are obtained by summing the corresponding higher-order coefficients in the arrays comprised in the second set 61 of arrays of DCT coefficients only. Thus, the final array 71 of DCT coefficients is suitable for representing the combined image at a relatively high resolution, at least higher than that of the image frames represented by the first sum array 64.

An inverse DCT operation 72 transforms the final array 71 of DCT coefficients into a final array 73 of pixel values, each corresponding to a light intensity over an area occupied by a pixel in the combined image.

The invention is not limited to the described embodiments, which may be varied within the scope of the accompanying claims. In particular, the methods outlined herein are suitable for partial or complete execution by another type of image processing system than the digital camera 1. For example, a general-purpose personal computer or work station may carry out the method on the basis of a first set of arrays of pixel values and a second set of arrays of pixel values in a sequence of arrays captured in rapid succession by the digital camera 1 and stored in the storage device 8. Processing of the arrays for relative alignment of at least the region of overlap between the image frames represented by them is an advantageous feature of each embodiment.

What is claimed is:

1. Method of forming a combined image based on a plurality of image frames, including:
   capturing the plurality of image frames by means of an image capturing device (5);
   obtaining a first set (18;30;47;64) of at least one array of intensity values for representing an image frame at a resolution corresponding to the number of intensity values in the array from the plurality of image frames, and obtaining a second set (19;31;46;61) of at least one array of intensity values for representing an image frame at a resolution corresponding to the number of intensity values in the array from the plurality of image frames, wherein the combined image is represented by a final array (20;42;54;71) of intensity values;
   determining a mapping function (22;33;49;65) for mapping the intensity values of the arrays in the first set (18;30,47;64) from a scale within a first range to a scale within a second range;
   mapping the intensity values of the arrays in the first set (18;30,47;64) on the basis of the mapping function;
   obtaining at least some of the intensity values in the final array (20;42;54;71) by executing a step (29;41;57;70) of summing an intensity value from each of at least one array (27;39;56;69) of intensity values based on at least one array of intensity values in only the first set (18;30;47;64) and an intensity value from each of at least one array (19;40;46;61) of intensity values based on at least one array of intensity values in only the second set (19;31;46;61); and
   arranging the first set (18;30;47;64) and the second set (19;31;46;61) such that the image frames represented by the arrays in the first set (18;30;47;64) are represented at lower resolutions than the image frames represented by the arrays in the second set (19;31;46;61),
   wherein at least some of the arrays of intensity values in the first and second set are obtained by reading out measurement values from an image-capturing device comprising an array of light-sensitive cells, wherein each intensity value in the final array (20;42;54;71) is based on at least one intensity value in an array comprised in the second set.

2. Method according to claim 1, wherein the at least one array (39;69) of intensity values based on at least one array of intensity values in only the first set (30;64) contains coefficients in the spatial frequency domain, wherein the at least one array (40;61) of intensity values based on at least one array of intensity values in only the second set (31;61) contains coefficients in the spatial frequency domain and wherein the intensity values in the final array (42;71) are formed by coefficients in the spatial frequency domain,
   wherein at least one lower order coefficient in the final array (42;71) is obtained by summing an intensity value from each of the at least one array (39;69) of intensity values based on at least one array of intensity values in only the first set (30;64) and an intensity value from each of at least one array (40;61) of intensity values based on at least one array of intensity values in only the second set (31;61), wherein at least one higher order coefficient in the final array (42;71) is obtained on the basis of only arrays (40;61) of intensity values based on the second set (31;61).

3. Method according to claim 1, including determining an upper limit of the second range at least partly in dependence on the number of arrays of intensity values in the second set (19;31;46;61).

4. Method according to claim 1, wherein at least one of the arrays of intensity values in the first set (47;64) is obtained by obtaining a plurality of arrays (45;60) of intensity values for representing an image frame at a resolution corresponding to the number of intensity values in the array, and by summing an intensity value from each of the plurality of arrays (45;60) to obtain a corresponding intensity value in the at least one array in the first set (47;64).

5. Method according to claim 1, wherein at least one of the arrays of intensity values in the first set (18;30;47;64) is obtained by obtaining a plurality of arrays (45;60) of intensity values for representing an image frame at a resolution corresponding to the number of intensity values in the array, wherein the method further includes summing an intensity value from each of the obtained plurality of arrays (45;60) to obtain a corresponding intensity value in an intermediate combined array (47;64), and determining an upper limit of the second range at least partly in dependence on at least one intensity value in the intermediate combined array (47;64).

6. Method according to claim 1, wherein at least the arrays of intensity values in the first set are obtained by obtaining a plurality of arrays of intensity values for representing colour image frames in a first colour space, and applying a transformation to a plurality of arrays of values in a second colour space, wherein, in the first colour space, an image frame is represented by parameter value combinations, each parameter indicating the intensity of one of a plurality of colour components, whereas, in the second colour space, an image frame is represented by parameter value combinations, one parameter of the combination indicating a hue and at least one of the other parameters being indicative of light intensity.

7. System for processing arrays of intensity values, each array being suitable for representing an image frame at a resolution corresponding to the number of intensity values in the array,
   the system comprising an imaging apparatus (1), which comprises a processor (7,9,11) and at least one storage device (8) for storing the arrays of intensity values wherein the system is configured to:
   capture a plurality of image frames by means of an image capturing device (5);
   retrieve a first set (18;30;47;64) of at least one array of intensity values and a second set (19;31;46;61) of at least one array of intensity values from the plurality of image frames, the arrays in the first set (18;30;47;64) and arrays in the second set representing respective image frames, and to form a final array (20;42;54;71) of intensity values representing a combined image, wherein the system is configured to obtain each of at least some of the intensity values in the final array (20;42;54;71) by:
   determining a mapping function (22;33;49;65) for mapping the intensity values of the arrays in the first set (18;30,47;64) from a scale within a first range to a scale within a second range;
   mapping the intensity values of the arrays in the first set (18;30,47;64) on the basis of the mapping function;

executing a step of summing an intensity value from each of at least one array (27;39;56;69) of intensity values based on at least one array of intensity values in only the first set (18;30;47;64) and an intensity value from each of at least one array of intensity values based on at least one array (19;40;46;61); and arranging the first set (18;30;47;64) and the second set (19;31;46;61) such that the image frames represented by the arrays in the first set (18;30;47;64) are represented at lower resolutions than the image frames represented by the arrays in the second set (19;31;46;61), wherein at least some of the arrays of intensity values in the first and second set are obtained by reading out measurement values from an image-capturing device comprising an array of light-sensitive cells, wherein each intensity value in the final array (20;42;54;71) is based on at least one intensity value in an array comprised in the second set.

8. Imaging apparatus (1), comprising a processor (7,9,11) and at least one storage device (8) for storing a plurality of arrays of intensity values, wherein the imaging apparatus is configured to execute a method according to claim 1.

\* \* \* \* \*